(12) United States Patent
Lehle et al.

(10) Patent No.: US 8,515,693 B2
(45) Date of Patent: Aug. 20, 2013

(54) METHOD AND DEVICE FOR DETERMINING THE DELIVERY VOLUME OF AN INJECTION PUMP

(75) Inventors: Walter Lehle, Leinfelden (DE); Michael Hackner, Marbach (DE); Frederik Blank, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 12/736,419

(22) PCT Filed: Mar. 27, 2009

(86) PCT No.: PCT/EP2009/053641
§ 371 (c)(1),
(2), (4) Date: Jan. 21, 2011

(87) PCT Pub. No.: WO2009/127510
PCT Pub. Date: Oct. 22, 2009

(65) Prior Publication Data
US 2011/0106463 A1    May 5, 2011

(30) Foreign Application Priority Data
Apr. 15, 2008   (DE) .................. 10 2008 001 182

(51) Int. Cl.
*G06F 19/00*   (2011.01)

(52) U.S. Cl.
USPC ............................................. 702/47

(58) Field of Classification Search
USPC ............................................. 702/47
See application file for complete search history.

(56) References Cited

U.S. PATENT DOCUMENTS 5,578,752 A * 11/1996 Schlecht et al. ............... 73/239
7,013,223 B1    3/2006 Zhang et al.

FOREIGN PATENT DOCUMENTS

| DE | 196 25 947 | 9/1997 |
| DE | 103 34 817 | 3/2005 |
| EP | 1 226 355 | 8/2005 |
| EP | 1 674 365 | 6/2006 |

OTHER PUBLICATIONS

S.H.Gawande, Cylinder Imbalance Detection of Six Cylinder Dl Diesel Engine Using Pressure Variation, S. H. Gawande et al/ International Journal of Engineering Science and Technology, vol. 2(3), 2010, 433-441.*

* cited by examiner

*Primary Examiner* — Tung S Lau
(74) *Attorney, Agent, or Firm* — Kenyon & Kenyon LLP

(57) ABSTRACT

By detecting the pressure time characteristic on the high-pressure side of an injection pump, the delivery volume of the pump is able to be determined without intervention in the injection system.

19 Claims, 3 Drawing Sheets ered. The present invention relates to a method and a device for determining the delivery volume of an injection pump.

METHOD AND DEVICE FOR DETERMINING THE DELIVERY VOLUME OF AN INJECTION PUMP

BACKGROUND OF THE INVENTION

1. Field of the Invention

The present invention relates to a method and a device for determining the delivery volume of an injection pump.

2. Description of Related Art

In principle, it is quite simple to determine the delivery volume of a pump within a test system. However, it is not desirable to uninstall it from the injection system and to insert it in a test system for the purpose of determining or checking the working capacity of an injection pump.

A current, no non-invasive methods or devices for determining the delivery volume of an injection pump installed in an injection system are offered on the market.

From published European patent application EP 1 226 355 B1, only a diagnosis method is known by which merely references to different errors or malfunctions of an injection pump can be determined without "invasive" intervention in the injection system. In this known method, the time characteristic of the pressure on the pressure side of the injection pump is detected essentially with the aid of a pressure sensor operating as component of the injection system for its control in the adaptation to different loading or operating states of the engine, and the time characteristic is subsequently converted into a frequency spectrum with the help of a computer, the frequency spectrum exhibiting clear maximums in the base or fundamental frequency of the pump, and also in its multiple, as a function of the engine speed in an intact injection pump. In the case of a three-piston pump provided according to published European patent application EP 1 226 355 B1, the maximums lie at the fundamental frequency $f_1$ as well as twice or triple the fundamental frequency, i.e., at $f_2=2f_1$, and $f_2=3f_1$. By subsequently comparing the frequency spectrum of the pump to be checked with a standard frequency spectrum of a fault-free injection pump, it is possible to derive empirically verifiable references to different faults of the injection pump as a function of the individually determined differences. However, no information whatsoever about the actual delivery volume of the injection pump to be checked or its relative output capacity in comparison with a theoretical delivery volume are determined in this manner. Thus, the parameter that is decisive for the output capacity of an injection pump, i.e., the delivery volume or an equivalent parameter, is not determined.

SUMMARY OF THE INVENTION

Therefore, it is the object of the present invention to provide a method and a device for determining the delivery rate of an injection pump without any intervention in the injection system.

The present invention is based on the recognition that it is definitely possible with corresponding information processing, to determine references to the measure of the delivery rate or the relation with the delivery rate in comparison to a standard delivery rate by the basically known detection of the frequency spectrum of the pressure on the pressure side of an injection pump. In the present invention, the particular fact is utilized that uneven outputs of the pump, i.e., uneven delivery rates of the pump pistons, have a considerable effect on the frequency spectrum, and that the deviations from a normal output of the pump that accompany uneven outputs are easily able to be determined using the information processing of the present invention.

Because of the scaling of the detected amplitudes of fundamental frequency $f_1$ according to the invention and the additional characteristic frequencies $f_2$ through fn of the frequency spectrum, random influences on the measure of the amplitude are eliminated. The number n of the characteristic frequencies is defined by the number of pistons of the injection pump. Typical injection pumps have three pistons, so that characteristic frequencies $f_1$ through $f_3$ occur. Finally, the present invention utilizes the fact that it is possible to assign different truth values or membership degrees for linguistically specifiable quality grades or quality values (e.g., "good", "good/marginal", "average", "poor" or "defective") to the values of different quotients formed from differently scaled amplitudes. A specifiable logic (in particular fuzzy logic) is used for this purpose.

It is then possible to assign empirically backed delivery volumes to the determined combinations of quality grades.

The delivery volumes determined in this manner then need only be compared with a limit delivery volume in order to decide whether the individual injection pump to be checked is defective or whether it needs to be exchanged.

Since it is sufficient in the method according to the present invention to detect the signals from a pressure sensor routinely available in the vehicle on the pressure side of the injection pump, there is the advantageous possibility of placing the data processing means and memory necessary for implementing the present method in the vehicle and possibly storing references to a reduced delivery volume of the injection pump in a memory able to be read out when the vehicle is inspected, or making a display available to the driver, which suggests a visit to the service facility to the driver before further operation of the vehicle becomes impossible as a result of a defect of the injection pump. However, the method according to the present invention is not restricted to vehicles having a pressure sensor installed in the vehicle. Instead, in injection systems without their own pressure sensor it is also possible to detect the pressure signals "off-board" using an additional sensor, e.g., a gripping pressure sensor, which has to be affixed separately in a non-invasive manner. As a result, the method of the present invention may also be used for old vehicles.

With regard to preferred features of the present invention, reference is made to the claims and the following elucidation of the drawing, with the aid of which the method according to the present invention and the device suitable for implementing the method are described in greater detail.

Protection is sought not only for expressly mentioned or illustrated feature combinations, but basically also for any individual features or any combinations of the individual features of the mentioned or illustrated feature combinations.

The additional figures show details of the present invention or the associated technological background.

To simplify the illustration, hereinafter it is assumed that the injection pump has three pistons.

DETAILED DESCRIPTION OF THE INVENTION

Figure 1:
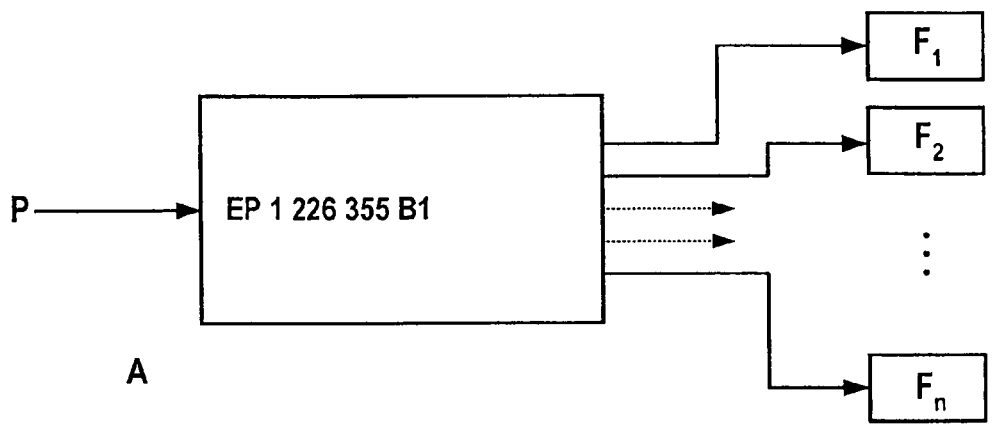
FIG. 1 shows, including Figures A and B, which compare the capacity of the system according to the present invention with a system according to the related art.
Figure 1:
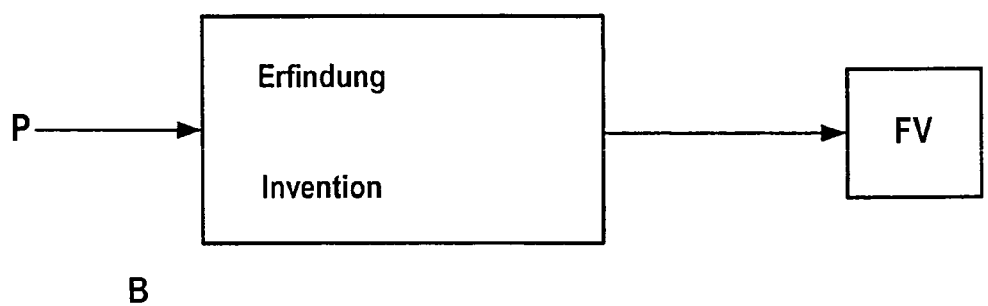

In illustration A of FIG. 1, the method of the published European patent application EP 1 226 355 B1 is shown in the form of a "black box" illustration. On the input side, the system of published European patent application EP 1 226 355 B1 requires the values of pressure p on the pressure side of the injection pump. On the output side, it is then possible to provide references to different faults $F_1$ to $F_n$. However, this does not include any quantitative references to the delivery volume of the respective pump.

Illustration B clarifies the advantages of the present invention, once again in the form of a "black box". In the present invention, the values of pressure p on the pressure side of the injection pump are recorded again on the input side. In an evaluation according to the present invention, it is therefore possible to indicate a dimension number for delivery volume FV or a dimension number range of the delivery volume. If desired, the delivery volume determined in this manner may then be automatically compared with a defined, minimally allowed delivery volume. If the determined delivery volume is smaller than the minimally allowed delivery volume, then a display "exchange injection pump" will be generated. If the determined delivery volume is sufficiently close to the defined, minimally allowed delivery volume, then a reference to a reduced (but sufficient) delivery rate may be stored in a diagnosis memory or similar device. If the delivery rate is sufficient, then such a display will be dispensed with, and no entry will be made the diagnosis memory.

Figure 2:
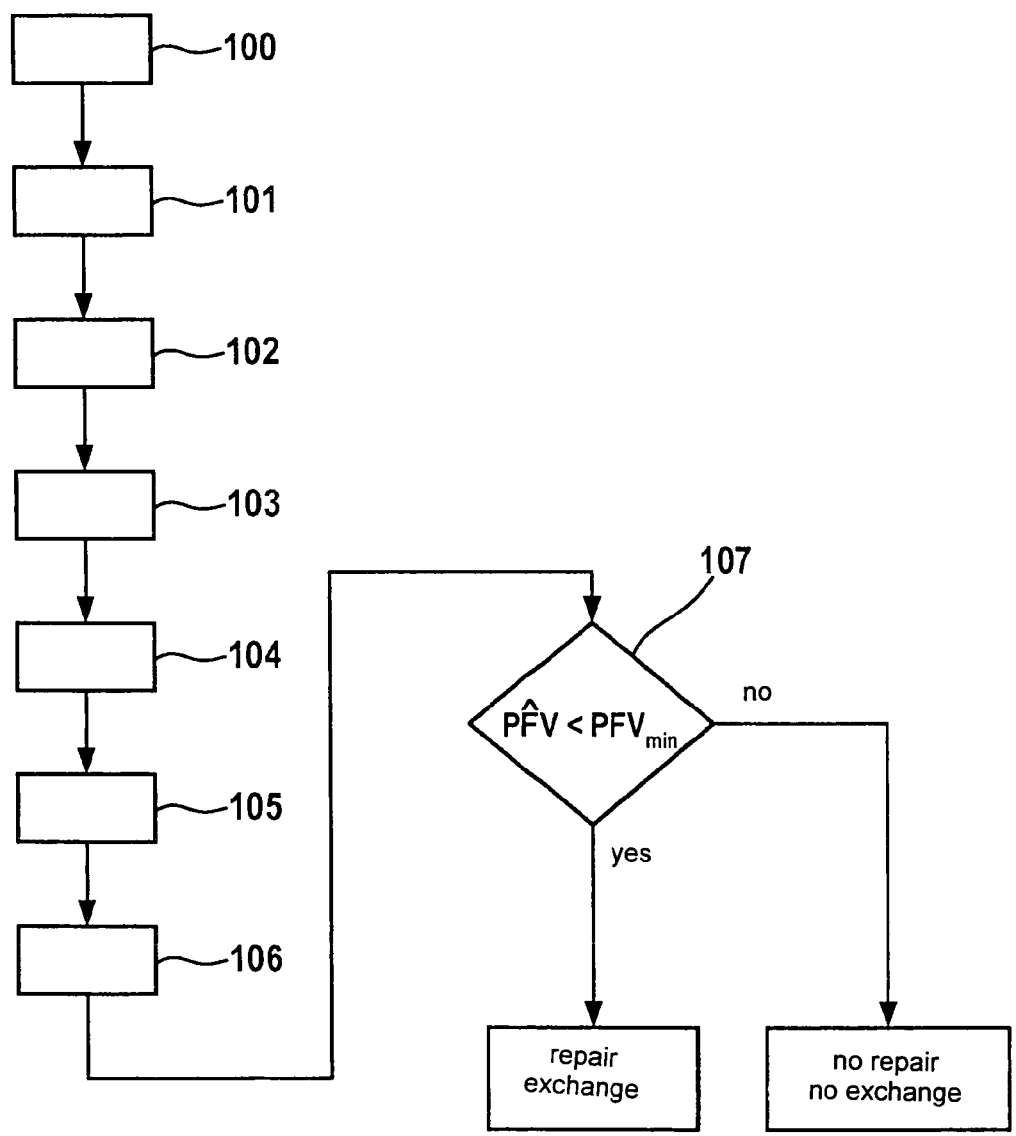
FIG. 2 shows a flow chart of the method according to the present invention.

FIG. 2 now shows a flow chart in connection with the present invention. First, according to position 100, pressure p is recorded on the pressure side of the injection pump as a function of time t while the injection system is in operation. According to position 101, a transformation of the recorded data then takes place in order to determine a frequency spectrum of the pump. At 102, amplitudes A of the frequency spectrum are subsequently determined for (engine-speed-dependent) frequencies $f_1$ and harmonic frequencies $f_2$ and $f_3$. Then, scaled amplitudes $m_1$, $m_2$ are determined according to position 103 by forming quotients from the amplitude of frequency $f_1$ and the amplitude of frequency $f_3$ as well as from the amplitude of frequency $f_2$ and the amplitude of the frequency $f_3$. (In an injection pump having more than three pistons, correspondingly more scaled amplitudes should be determined.)

According to position 104, quality classes $Q(m_j)$, such as the classes "good", "good/marginal", "average", "poor" or "defective" may be assigned to the values of scaled amplitudes $m_j$, based on expert knowledge stored in a memory. The number of classes may be specified according to the desired precision, i.e., the range of possible values of $m_1$ and $m_2$ is subdivided into basically freely selectable classes.

Figure 3:
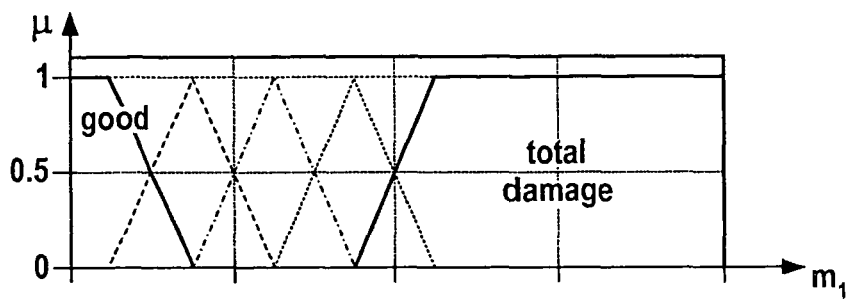
FIG. 3 shows value ranges of various linguistic values.
Figure 3:
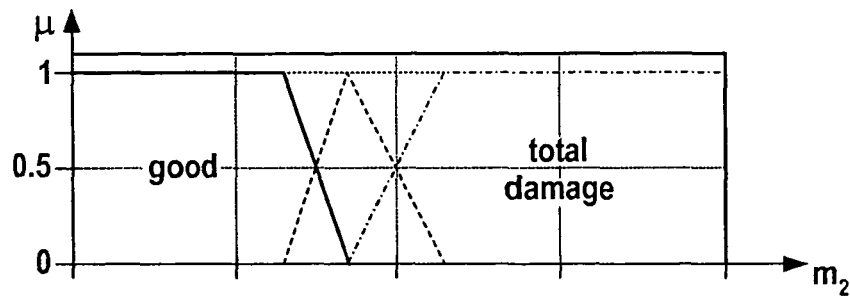

Based on empirical findings, value ranges of $m_1$ may, for example, be assigned five classes, i.e., five linguistic values (e.g., "good", "good/marginal", "average", "poor" or "defective"). In the following text, these linguistic values for $m_1$ are denoted by $LV_{1,1}$ through $LV_{1,5}$. In a similar manner, the value ranges of $m_2$ are assigned to three linguistic values $LV_{2,1}$ through $LV_{2,3}$, e.g., "good", "average" or "defective". This is illustrated in FIG. 3, where different truth values $\mu$ between 0 and 1 are simultaneously assigned to linguistic values $LV_{1,1}$ through $LV_{1,5}$ as a function of the particular value of $m_1$. In so doing, truth values $\mu$ are assigned in such a way that the sum of the truth values has the value of 1 for each value of $m_1$ or $m_2$. In the example from FIG. 3, this is ensured by using triangles, for example, as membership function of the values of $m_1$ or $m_2$ to the individual linguistic values.

A fuzzy logic is used, which allows a fuzzy class description. This method has two essential advantages in comparison with other classification methods:

Verbal description of the classes by rules

Robust method with respect to interference.

This makes it possible to incorporate verbal expert knowledge from the pump development or of skilled service station personnel in the class description. Such a rule may read:

IF $m_1$=good AND $m_2$=good, THEN the pump delivery rate ratio (PFV)=100%.

Furthermore, since the classes are not subdivided based on sharply defined boundaries, the classification results are less affected by interference (e.g., by temperature and pressure fluctuations or measuring noise).

The truth value or membership degree $\mu$ to a class may assume values between 0 and 1 according to the above statements, and describes the strength of the membership of a feature in a particular class or linguistic variable. According to the above statements, the classes are selected in such a way that the sum of the membership degrees always results in the value 1 for all values of $m_1$ and $m_2$, i.e., $$\sum_j \mu_{LV1,j}(m_1) = 1 \text{ and } \sum_j \mu_{LV2,j}(m_2) = 1$$

The peak values of the membership functions of FIG. 3 are able to be represented in the following table:

| Rule | $\mu_{LV1/2.1} = 1$ (good) | $\mu_{LV1/2.2} = 1$ | $\mu_{LV1/2.3} = 1$ | $\mu_{LV1/2.4} = 1$ | $\mu_{LV1/2.5} = 1$ (defective) |
|---|---|---|---|---|---|
| $m_1$ | 1 | 2 | 3 | 4 | 5 |
| $m_2$ | 1 | 2 | 3 | — | — |

In position 105 of FIG. 2, the classes are then assigned to the pump delivery rate-ratios. Ab initio, this a) is possible based on expert knowledge, in which case the pump developers have to make one-time statements regarding the quality of a pump type based on any number of classes for the pump's supply rate-ratio (good, marginal, average, poor or defective), or b) is achieved via a project-specific quantity mass balance for an engine project, through which the pumps are assigned to the aforementioned classes for the pump's delivery rate-ratio based on the satisfaction of the mass balance of the high-pressure injection system; for example, 80% of the pump's delivery rate-ratio satisfies the quantity mass balance of good, 60% of the pump's delivery rate-ratio, for example, does not satisfy the quantity mass balance (defect case).

Based on the measurements and statements from the pump development and calculations of the mass balance, a control basis for the pump assessment with the aid of features $m_1$ and $m_2$ is able to be set up. The following table provides an example for such a control basis, in which the expert knowledge is linked to the features. It helps in estimating the pump's delivery rate-ratio for each linguistic value as a function of the class membership of the feature.

|  | PFV[%] | good | good/marginal | $m_1$ average | poor | defective |
|---|---|---|---|---|---|---|
| $m_2$ | good | 100 | 90 | 80 | 70 | 60 |
|  | average | 90 | 90 | 80 | 70 | 60 |
|  | poor | 80 | 80 | 80 | 70 | 60 | where $$PFV[\%] = \frac{\text{measured pump delivery rate}}{\text{theoretical pump delivery rate}} \cdot 100$$

The rules in this table are able to be read as follows:
IF $m_1$=good AND $m_2$=average, THEN PFV=90%.

The aforementioned rules are linked to one another and processed according to the fuzzy logic theory, in the steps of fuzzification, aggregation, implication, accumulation and defuzzification, for instance.

The AND operation (aggregation) from the rules is implemented with the aid of a minimum operator, for example:

$$\mu_{res,i} = \min\{\mu_{LV1,\kappa}(m_1), \mu_{LV2,j}(m_2)\}$$

where
$\mu_{res,i}$=the result of the fuzzy membership function for rule i,
$\mu_{LV1,\kappa}$=membership degree $m_1$ to class k,
$\mu_{LV2,j}$=membership degree $m_2$ to class j.

Figure 4:
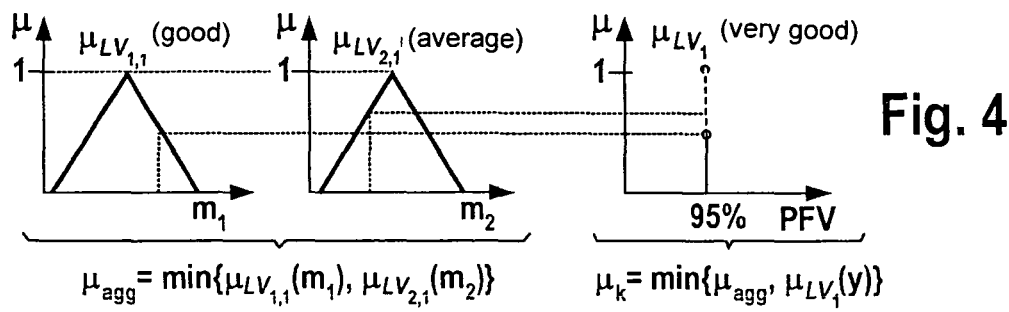
FIG. 4 explains the operation of the device with the aid of an example.

This is followed by the implication, which implements the IF-THEN linkage. If, as shown in FIG. 4 by way of example, one selects singleton membership functions for the conclusion (THEN component) here, then the membership degree of the conclusion of each individual rule corresponds to the resulting membership degree $\mu_{res,i}$ of the precondition (WHEN-component). FIG. 4 explains the operations with the aid of an example.

In a next step, the implication result of all rules must be linked. A maximum operator, for example, is used for this purpose:

$$\mu_{akk}(PFV) = \max\{\mu_{res,i}(m_1, m_2, PFV), \ldots, \mu_{res,i}(m_1, m_2, PFV)\}$$

Figure 5:
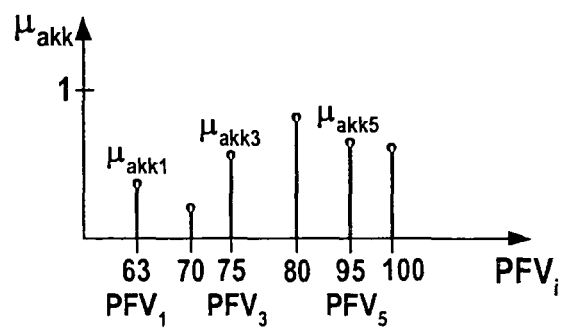
FIG. 5 shows a possible result of the accumulation.

One possible result of the accumulation is shown in FIG. 5 by way of example.

A final statement regarding the pump's delivery rate-ratio is obtained in position 106 of FIG. 2 by a defuzzification as follows:

$$P\hat{F}V = \frac{\sum_{i=1}^{N} PFV_i \cdot \mu_{akk}(m_{i,1}, m_{i,2}, PFV_i)}{\sum_{i=1}^{N} \mu_{akk}(m_{i,1}, m_{i,2}, PFV_i)}$$

The result is the estimated pump delivery rate-ratio in percent ($P\hat{F}V$). The ratio formation and percentage representation has been selected to better estimate the delivery rate, but it is also possible to work with direct pump delivery rates.

$PFV_i$ denotes the delivery rate ratio in percent at location i following the aggregation. $\mu_{agg,i}$ is the resulting membership function following the accumulation of all rules at location i. It is now also possible to compare ($P\hat{F}V$) with an empirically specified value $PFV_{min}$ in position 107 of FIG. 2, so that instructions to act may be issued such as "exchange pump", for example, as a function of the result of the

What is claimed is:

1. A method for determining the delivery volume of an injection pump, comprising:
   transforming a time characteristic of a pressure signal from a pressure sensor on a pressure side of the injection pump into a frequency spectrum using a processing device,
   identifying from the frequency spectrum amplitudes for a specified engine speed dependent frequency as well as for a harmonic frequency of a second piston and each additional piston in the injection pump,
   determining quotients of the identified amplitudes, subdividing a range of possible values of the quotients into classes,
   assigning a class to each of the quotients based on its value according to the subdividing, and
   converting the assigned class combinations for specified quotient combinations into measures or ranges of measures of the delivery volume utilizing stored or empirical data.

2. The method as recited in claim 1, further comprising scaling the amplitudes identified for the engine speed dependent frequency and the harmonic frequency of the second and each additional piston its multiple to an amplitude of a greatest detected multiple of the engine speed dependent frequency.

3. The method as recited in claim 1, wherein the time characteristic of the pressure signal is recorded with the aid of the pressure sensor disposed as part of an injection system.

4. The method as recited in claim 1, wherein the time characteristic of the pressure signal is detected with an aid of an external pressure sensor which is able to be mounted in a non-invasive manner.

5. The method as recited in claim 1, wherein the time characteristic of the pressure signal is detected with an aid of a control device in the vehicle or with the aid of an additional external data-processing device.

6. The method as recited in claim 1, further comprising comparing a determined delivery volume or delivery-rate ratio with an empirically predefined limit value ($PFV_{min}$), and suggesting an action or repair as a function of a result of the comparing.

7. The method as recited in claim 2, wherein the time characteristic of the pressure signal is recorded with an aid of the pressure sensor disposed as part of an injection system.

8. The method as recited in claim 2, wherein the time characteristic of the pressure signal is detected with an aid of an external pressure sensor which is able to be mounted in a non-invasive manner.

9. The method as recited in claim 2, wherein the time characteristic of the pressure signal is detected with an aid of a control device in the vehicle or with the aid of an additional external data-processing device.

10. The method as recited in claim 2, wherein a determined delivery volume or delivery-rate ratio is compared with an empirically predefined limit value and an action or repair suggestion is made as a function of a result of the comparison.

11. The method as recited in claim 3, wherein the time characteristic of the pressure signal is detected with an aid of a control device in the vehicle or with the aid of an additional external data-processing device.

12. The method as recited in claim 3, wherein a determined delivery volume or delivery-rate ratio is compared with an empirically predefined limit value and an action or repair suggestion is made as a function of a result of the comparison.

13. The method as recited in claim 4, wherein the time characteristic of the pressure signal is detected with an aid of a control device in the vehicle or with the aid of an additional external data-processing device.

14. The method as recited in claim 4, wherein a determined delivery volume or delivery-rate ratio is compared with an empirically predefined limit value and an action or repair suggestion is made as a function of a result of the comparison.

15. The method as recited in claim 5, wherein a determined delivery volume or delivery-rate ratio is compared with an empirically predefined limit value and an action or repair suggestion is made as a function of a result of the comparison.

16. A device for implementing the method as recited in claim 5, wherein the processing device is able to be connected, or is connected, to an output of the pressure sensor on the pressure side of the injection pump.

17. A device for implementing the method as recited in claim 6, wherein a display for determined measured values or action recommendations is provided.

18. A device for implementing the method as recited in claim 9, wherein the processing device is able to be connected, or is connected, to an output of the pressure sensor on the pressure side of the injection pump.

19. A device for implementing the method as recited in claim 10, wherein a display for determined measured values or action recommendations is provided.

\* \* \* \* \*

UNITED STATES PATENT AND TRADEMARK OFFICE
CERTIFICATE OF CORRECTION

PATENT NO. : 8,515,693 B2 Page 1 of 1
APPLICATION NO. : 12/736419
DATED : August 20, 2013
INVENTOR(S) : Lehle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 395 days.

Signed and Sealed this

Fifteenth Day of September, 2015

Michelle K. Lee
*Director of the United States Patent and Trademark Office*